United States Patent
Wang et al.

(10) Patent No.: US 10,462,878 B2
(45) Date of Patent: Oct. 29, 2019

(54) METHOD AND APPARATUS AND DEVICE FOR IMPLEMENTING TELEVISION THEATER MODE, AND STORAGE MEDIUM

(71) Applicant: SHENZHEN SKYWORTH-RGB ELECTRONIC CO., LTD., Shenzhen, Guangdong (CN)

(72) Inventors: Xuan Wang, Shenzhen (CN); Zhaobin Wu, Shenzhen (CN); Jian Yang, Shenzhen (CN); Minghuo Yu, Shenzhen (CN)

(73) Assignee: SHENZHEN SKYWORTH-RGB ELECTRONIC CO., LTD., Shenzhen (CN)

(*) Notice: Subject to any disclaimer, the term of this patent is extended or adjusted under 35 U.S.C. 154(b) by 0 days.

(21) Appl. No.: 16/090,628

(22) PCT Filed: Dec. 22, 2017

(86) PCT No.: PCT/CN2017/117944
§ 371 (c)(1),
(2) Date: Oct. 2, 2018

(87) PCT Pub. No.: WO2018/161685
PCT Pub. Date: Sep. 13, 2018

(65) Prior Publication Data
US 2019/0116646 A1   Apr. 18, 2019

(30) Foreign Application Priority Data
Mar. 8, 2017 (CN) .......................... 2017 1 0137944

(51) Int. Cl.
*H05B 37/02* (2006.01)
*H04N 5/60* (2006.01)
(Continued)

(52) U.S. Cl.
CPC .......... *H05B 37/0227* (2013.01); *A47H 5/02* (2013.01); *A47H 5/14* (2013.01); *H04N 5/60* (2013.01);
(Continued)

(58) Field of Classification Search
CPC combination set(s) only.
See application file for complete search history.

(56) References Cited

U.S. PATENT DOCUMENTS 6,771,323 B1 * 8/2004 Dean .................... G11B 27/034
348/180
8,089,567 B2 * 1/2012 Chung .................... H04N 5/74
348/460

(Continued)

FOREIGN PATENT DOCUMENTS

CN       102769555       11/2012
CN       103686154 A     3/2014
(Continued)

OTHER PUBLICATIONS

International search report dated Feb. 26, 2018 from corresponding application No. PCT/CN2017/117944.
(Continued)

*Primary Examiner* — Brian P Yenke
(74) *Attorney, Agent, or Firm* — Hauptman Ham, LLP (57) ABSTRACT

Disclosed is a method for implementing a television theater mode, including: detecting playback content played by a playback terminal in real time when the playback terminal is in a playing status; when detecting that the playback terminal is playing a video, detecting current statuses of theater sound equipment, lighting equipment, and a curtain; sending a sound-and-light control command to a theater sound system and a curtain control system based on the current statuses of the theater sound equipment and the curtain, to
(Continued)

adjust a current playback environment as a sound-and-light environment of the television theater mode; reading the video resource being played, determining a video image brightness change based on the read video resource, and sending the sound-and-light control command to the lighting control system, to adjust brightness of the indoor lighting equipment based the video image brightness change. Further disclosed is an apparatus for implementing a television theater mode.

8 Claims, 6 Drawing Sheets

(51) Int. Cl.
*A47H 5/14* (2006.01)
*A47H 5/02* (2006.01)
*H04N 5/445* (2011.01)

(52) U.S. Cl.
CPC ........ *A47H 2005/025* (2013.01); *H04N 5/445* (2013.01)

(56) References Cited

U.S. PATENT DOCUMENTS

| | | | | |
|---|---|---|---|---|
| 8,238,726 | B2* | 8/2012 | Takatsuji | G06F 21/10 386/338 |
| 9,317,113 | B1* | 4/2016 | Karakotsios | G06F 3/013 |
| 10,027,920 | B2* | 7/2018 | Freiin von Kapri | H04N 5/4403 |
| 2007/0067810 | A1* | 3/2007 | Durden | H04N 5/44543 725/80 |
| 2007/0166671 | A1* | 7/2007 | Walter | G09B 5/00 434/98 |
| 2009/0051825 | A1* | 2/2009 | Asayama | H04N 5/60 348/738 |
| 2009/0262256 | A1* | 10/2009 | Asayama | H04N 5/60 348/738 |
| 2009/0290065 | A1* | 11/2009 | Asayama | H04N 5/44543 348/553 |
| 2010/0271560 | A1* | 10/2010 | Higuchi | H04N 21/43615 348/738 |
| 2011/0032423 | A1* | 2/2011 | Jing | H04L 12/282 348/552 |
| 2011/0052141 | A1* | 3/2011 | Takatsuji | H04N 5/775 386/231 |
| 2012/0180093 | A1* | 7/2012 | Ishihara | H04N 5/607 725/80 |
| 2013/0321645 | A1* | 12/2013 | Cashin | H04N 17/00 348/189 |
| 2014/0172123 | A1* | 6/2014 | Lee | G05B 15/02 700/17 |
| 2014/0176518 | A1 | 6/2014 | Min et al. | |
| 2015/0067805 | A1* | 3/2015 | Martin | G06F 16/27 726/7 |
| 2015/0089551 | A1* | 3/2015 | Bruhn | H04N 7/106 725/80 |
| 2015/0115834 | A1* | 4/2015 | Cho | H05B 37/0227 315/294 |
| 2015/0154976 | A1* | 6/2015 | Mutagi | H04L 12/281 704/275 |
| 2017/0048476 | A1* | 2/2017 | Freiin von Kapri | H04N 5/4403 |
| 2017/0187809 | A1* | 6/2017 | Chen | H04L 67/125 |
| 2017/0351669 | A1* | 12/2017 | Yuan | G06F 16/7867 |
| 2018/0073889 | A1* | 3/2018 | Vigilante | G01C 21/20 |
| 2018/0107446 | A1* | 4/2018 | Wilberding | H04N 21/43615 |
| 2018/0285641 | A1* | 10/2018 | Yan | G06F 3/011 |
| 2019/0007232 | A1* | 1/2019 | Kim | H04L 12/28 |
| 2019/0033600 | A1* | 1/2019 | Raghoebardajal | H04N 5/58 |

FOREIGN PATENT DOCUMENTS

| | | |
|---|---|---|
| CN | 204425550 U | 6/2015 |
| CN | 104936334 | 9/2015 |
| CN | 204667050 U | 9/2015 |
| CN | 105208436 | 12/2015 |
| CN | 105208436 A | 12/2015 |
| CN | 105263044 A | 1/2016 |
| CN | 105788562 A | 7/2016 |
| CN | 105872748 A | 8/2016 |
| CN | 105872748 A | 8/2016 |
| CN | 105979400 A | 9/2016 |
| CN | 106325246 | 1/2017 |
| CN | 106422374 | 2/2017 |
| CN | 106878787 | 6/2017 |

OTHER PUBLICATIONS

Chinese Office Action issued in corresponding Chinese Patent Application No. 201710137944.7 dated Mar. 7, 2019, pp. 1-9.

* cited by examiner

METHOD AND APPARATUS AND DEVICE FOR IMPLEMENTING TELEVISION THEATER MODE, AND STORAGE MEDIUM

CROSS-REFERENCE TO RELATED APPLICATIONS

The present application is the National Stage of International Application No. PCT/CN2017/117944, filed Dec. 22, 2017, which claims the benefit of China Patent Application No. 201710137944.7, filed Mar. 8, 2017 with the State Intellectual Property Office and entitled "Method and Apparatus for Implementing Television Theater Mode".

TECHNICAL FIELD

The present disclosure relates to the technical field of televisions, and more particularly, to a method and an apparatus for implementing a television theater mode.

BACKGROUND

In recent years, as people's living standards continue to improve, people are having more and more types of entertainment, among which watching movies is a popular type of entertainment that most people like. In order to experience better visual and auditory effects, more and more people choose to walk into a movie theater to watch movies. However, the cost of entering a movie theater to watch a movie is relatively high. People therefore also hope to experience better visual and auditory effects through just the television at their homes.

Thus, with the development of the television industry, the manufacturer would integrate peripherals that are meant to enhance the experiences such as a theater sound system into the television system in the process of manufacturing a television, so that the users can experience the audiovisual effects and clear picture quality found in the theater through the television. However, the theater modes in current-stage televisions are mostly realized by way of replacing color scheme of the image and by way of sound amplifiers, such that the effects of the playback environment cannot be brought to the same league as the theater environment. Furthermore, the conversion is generally triggered by direct manual switching based on a menu. Therefore, the experience needs yet to be enhanced relative to that of the theater, and the degree of intelligence of the operation process is relatively low.

SUMMARY

It is therefore a primary object of this disclosure to provide a method and an apparatus for implementing a television theater mode, to solve the technical problem that the playback environment cannot reach the effects of the theater environment and that the operation process has a relatively low degree of intelligence.

In order to achieve the above object, this disclosure provides a method for implementing a television theater mode, the method including the following operations:

when a playback terminal is in a playing status, detecting playback content of the playback terminal in real time;

when detecting that the playback terminal is playing a video, detecting current statuses of theater sound equipment, lighting equipment, and a curtain;

sending a sound-and-light control command to a theater sound system and to a curtain control system based on the current statuses of the theater sound equipment and the curtain, to adjust a current playback environment as a sound-and-light environment of the television theater mode; and reading the video resource in play, determining a video image brightness change based on the read video resource, and sending the sound-and-light control command to a lighting control system to adjust brightness of the indoor lighting equipment based on the video image brightness change.

In addition, in order to achieve the above-described object, this disclosure further provides an apparatus for implementing a television theater mode, the apparatus including:

a detection module that detects playback content of a playback terminal in real time when the playback terminal is in a playing status, and that detects current statuses of theater sound equipment, lighting equipment, and a curtain in response to detecting that the playback terminal is playing a video;

a transmission module that sends a sound-and-light control command to a theater sound system and to a curtain control system based on the current statuses of the theater sound equipment and the curtain, to adjust a current playback environment as a sound-and-light environment of the television theater mode; and a reading module that reads the video resource in play, determines a video image brightness change based on the read video resource, and sends the sound-and-light control command to a lighting control system to adjust brightness of the indoor lighting equipment based on the video image brightness change.

In addition, in order to achieve the above-described object, this disclosure yet further provides a device for implementing a television theater mode, the device including a processor and a memory that stores a television theater mode implementation program. The processor is configured to execute the television theater mode implementation program to perform the operations described above for implementing the television theater mode.

Yet, in order to achieve the above-described object, this disclosure still further provides a computer-readable storage medium having stored therein one or more programs that can be executed by one or more processors to perform the operations described above for implementing the television theater mode.

According to the method and apparatus for implementing a television theater mode that are provided by this disclosure, when a playback terminal is in a playing status, playback content played by the playback terminal is detected in real time. When detecting that the playback terminal is playing a video, current statuses of theater sound equipment, lighting equipment, and a curtain are detected. Then based on the current statuses of the theater sound equipment and the curtain, a sound-and-light control command is sent to a theater sound system and a curtain control system to adjust a current playback environment as a sound-and-light environment of the television theater mode. Further, the video resource in play is read and then based on to determine a video image brightness change, and the sound-and-light control command is further sent to a lighting control system to adjust the brightness of the indoor lighting equipment based on the video image brightness change. Thus, discomfort caused to the eye by the screen being too bright for a long time or by sudden changes in brightness of the screen can be prevented. As a result, the screen being viewed can present even finer effects, and the current viewing environment can provide better visual and auditory effects. In addition, the viewing environment can be adjusted as the sound-and-light environment of the theater mode without needing the user for manual switching, thereby improving the intelligence of the operation process and thus enhancing the user's viewing comfort.

Various implementations for achieving the objects, functional features, and advantages of this disclosure will now be described in further detail in connection with embodiments and the accompanying drawings.

DETAILED DESCRIPTION OF ILLUSTRATIVE EMBODIMENTS

It will be appreciated that the specific embodiments described herein are merely illustrative of the present disclosure and are not intended to limit the disclosure.

Figure 1:
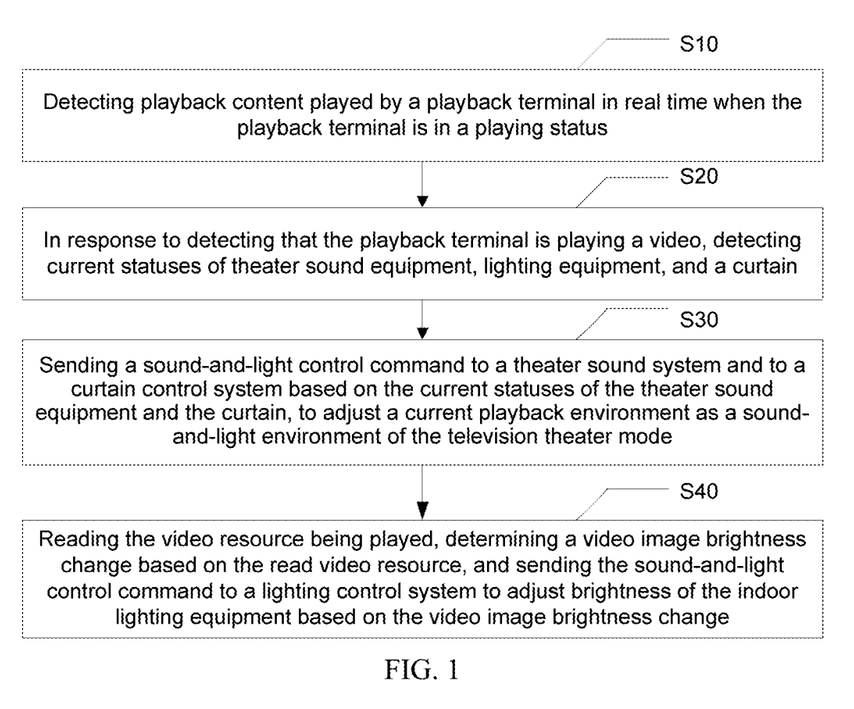
FIG. 1 is a flowchart illustrating a first embodiment of a method for implementing a television theater mode in accordance with the present disclosure.

Referring to FIG. 1, there is depicted a flowchart illustrating a method for implementing a television theater mode in accordance with the present disclosure. In this embodiment, the method includes the following blocks S10 to S40.

In S10, the method includes: when a playback terminal is in a playing status, detecting playback content of the video player in real time.

In this embodiment, when a user is watching a movie or television video, to achieve better viewing effects, the user can turn on the theater mode. Then after the user has turned on the theater mode, the playback content played by the playback terminal needs to be detected in real time when the playback terminal is in the playing status. In general, only when the user is watching a movie or a television program will the current viewing environment need to be automatically set to the theater mode. Thus, the real-time detection of the playback content played on the video player is mainly for the purpose of detecting whether the content being played is a movie or a television video. In particular, a video flag bit can be set when the playback terminal recognizes a port such as a USB port or a network port for subsequent playback of the resource information. Therefore, when the flag bit is detected, then it indicates that the content being played is a movie or television video. As one alternative, the playback content being played can be directly taken and analyzed to determine whether a movie or television video is currently being played. As another alternative, an electronic program guide of the television can also be utilized to directly learn whether the content played at the current time point is a movie or television video. It will be appreciated that the method of determining whether the currently played content is a movie or television video will not be limited to the above enumerated methods, but other possible methods are not to be detailed herein. The method then proceeds to block S20.

In S20, the method includes: in response to detecting that the playback terminal is playing a video, detecting current statuses of theater sound equipment, lighting equipment, and a curtain. A specific type of the video may be further classified. For example, a further determination can be made as to whether the video is a variety show type video, or a movie type video, specifically according to the user's preferences. In order that the current embodiment is properly implemented, the theater sound system, the lighting control system, and the curtain control system need to be connected to the television prior to the implementation of this embodiment. Thus, respective control systems need to be installed in the theater sound equipment, the lighting equipment, and the curtain, in order to facilitate their connection with the television. The television can set up a connection with the theater sound equipment, the lighting equipment, and the curtain via various types of communication modes such as Bluetooth, WIFI, and optical fiber. The theater sound system generally includes multiple indoor audio devices, which can be controlled to adjust the sound volume and the output mode, etc. The lighting control system mainly includes a lighting control module and a communication module. The curtain control system mainly includes a curtain control module and a communication module. The lighting control system can control and adjust the indoor lighting environment through a power supply, and the curtain control system can adjust the entry status of outdoor light through related control components. The method then continues to block S30.

In S30, the method includes: sending a sound-and-light control command to the theater sound system and to the curtain control system based on the current statuses of the theater sound equipment and the curtain, to adjust a current playback environment as a sound-and-light environment of the television theater mode.

After the detection of the current statuses of the theater sound equipment, the lighting equipment, and the curtain is completed, a further determination can be made as to whether the current statuses of the theater sound equipment and the curtain are the corresponding states of the theater mode. If the current statuses of the theater sound equipment and the curtain are not the corresponding states of the theater mode, then a sound-and-light control command would be sent to the theater sound system and to the curtain control system so that various audio device would be activated according to the received sound-and-light control command, while the curtain would be pulled down or closed according to the received sound-and-light control command. Specifically, the curtain control system may include a single-chip microcomputer module, a Bluetooth, WIFI or fiber optic communication module; and a related control component. Different types of curtains generally may have different control components. For example, when the curtain is a general direct-pull up-and-down type or left-right type curtain, then the related control component may be a stepper motor, and the single-chip microcomputer may pull the curtain into motion through the stepper motor so as to directly block off the entry of outdoor light. Otherwise, if the curtain is a venetian blind, then the single-chip microcomputer may control the stepper motor in cooperation with a blind control structure to adjust an opening or closing angle of the slats, thus achieving finer control of the entry of outdoor light. In a further example, if the curtain is a new type of dimmable glass, then the single-chip microcomputer may directly output an adjustable voltage to adjust the degree of transparency of the window glass, thus achieving adjustment of the entry of outdoor light. The method then continues to block S40.

In S40, the method includes: reading the video resource in play, determining a video image brightness change based on the read video resource, and sending the sound-and-light control command to a lighting control system to adjust brightness of the indoor lighting equipment based on the video image brightness change.

After the speaker equipment is activated and the curtain is pulled down or closed, a screen image brightness of the video being played needs to be further taken in conjunction for the purpose of adjusting the brightness of the lighting equipment in the current playback environment. Thus, the video resource being played needs to be first read, and then the read video resource is based on to determine a video image brightness change. Then the sound-and-light control command is sent to the lighting control system to adjust brightness of the indoor lighting equipment based on the video image brightness change.

According to the method for implementing a television theater mode provided by this embodiment, when a playback terminal is in a playing status, playback content played by the playback terminal is monitored in real time. When detecting that the playback terminal is playing a video, current statuses of theater sound equipment, lighting equipment, and a curtain are detected. Then based on the current statuses of the theater sound equipment and the curtain, a sound-and-light control command is sent to a theater sound system and a curtain control system to adjust a current playback environment as a sound-and-light environment of the television theater mode. Further, the video resource in play is read and then based on to determine a video image brightness change, and the sound-and-light control command is further sent to a lighting control system to adjust the brightness of the indoor lighting equipment based on the video image brightness change. Thus, discomfort caused to the eye by the screen being too bright for a long time or by sudden changes in brightness of the screen can be prevented. As a result, the screen being viewed can present even finer effects, and the current viewing environment can provide better visual and auditory effects. In addition, the viewing environment can be adjusted as the sound-and-light environment of the theater mode without needing the user for manual switching, thereby improving the intelligence of the operation process and thus enhancing the user's viewing comfort.

Figure 2:
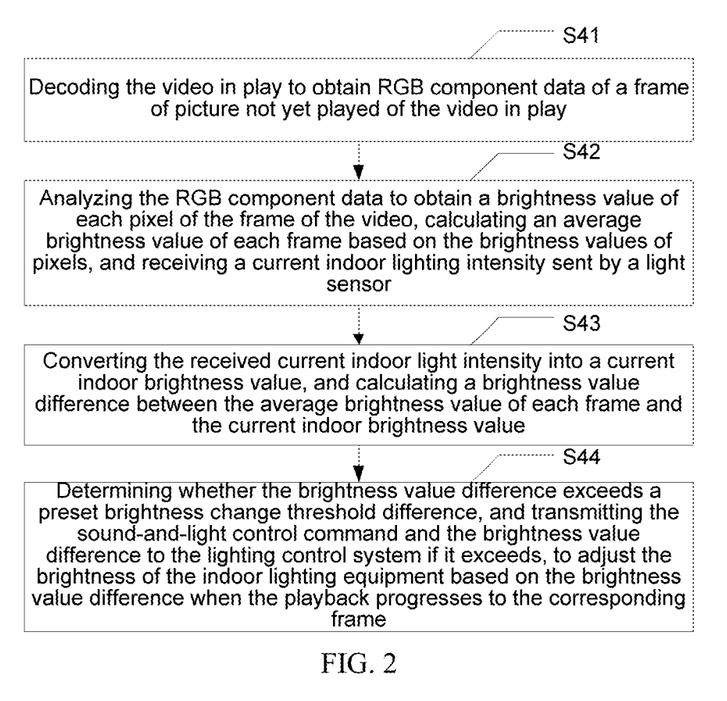
FIG. 2 is a detailed flowchart illustrating a block of "reading the video resource in play, determining a video image brightness change based on the read video resource, and sending the sound-and-light control command to a lighting control system to adjust brightness of the indoor lighting equipment based on the video image brightness change" in a second embodiment of the method for implementing a television theater mode in accordance with the present disclosure.

Referring now to FIG. 2, a second embodiment of the method for implementing a television theater mode in accordance with this disclosure is further provided on the basis of the first embodiment of the method for implementing a television theater mode.

In this embodiment, block S40 includes the following operations S41 to S44.

In S41, the block includes: decoding the video in play to obtain RGB component data of a video picture being played.

In S42, the block includes: analyzing the RGB component data to obtain a brightness value of each pixel of the video picture, calculating an average brightness value of each frame based on the brightness values of the pixels, and receiving an indoor lighting intensity sent by a light sensor in real time.

In S43, the block includes: converting the indoor light intensity into a current indoor brightness value, and calculating a brightness value difference between the average brightness value and the current indoor brightness value.

In S44, the block includes: determining whether the brightness value difference exceeds a preset brightness change threshold difference, and transmitting the sound-and-light control command and the brightness value difference to the lighting control system if the brightness value difference exceeds the preset brightness change threshold difference, to adjust the brightness of the indoor lighting equipment based on the brightness value difference when the video progresses to the corresponding frame.

In this embodiment, after reading the video resource in play, the video in play is decoded to obtain the RGB component data of the video picture being played. Then an image processing CPU is used to analyze the RGB component data to obtain a brightness value Y of each pixel of the video picture, where the specific calculation formula can be as follows: $Y=0.299R+0.587G+0.114B$. After the brightness value of each pixel of the video picture has been calculated, an average value among the respective brightness values of the various pixels of the video picture is further calculated, where the specific calculation method can be as follows. First calculating a sum of the brightness values of the pixels of the video picture. Then divide the calculated sum by the number of pixels, thus obtaining the average value among the respective brightness values of the various pixels of the video picture. In this process, a light sensor is also further needed to capture the indoor lighting intensity in real time. The light sensor can be installed at a position away from the television behind the television to prevent the direct illumination of the television from affecting the accuracy of the indoor lighting intensity detection. After the indoor lighting intensity is collected, the collected indoor lighting intensity needs to be transmitted to the television in real time. After receiving the indoor lighting intensity, the television needs to convert the indoor lighting intensity into an indoor brightness value. The specific method of implementation can be as follows: obtaining a maximum indoor lighting intensity $L_{max}$, dividing the current indoor lighting intensity L by the maximum lighting intensity $L_{max}$, and then multiplying the produced quotient by 255, thus obtaining the indoor brightness value. Then, the indoor brightness value is subtracted from the average value of the respective brightness values of the various pixels of the video picture to obtain the brightness value difference between the average brightness value and the indoor brightness value, and a determination is further made as to whether the brightness value difference exceeds the preset brightness change threshold difference. If the brightness value difference exceeds the preset brightness change threshold difference, then the sound-and-light control command as well as the brightness value difference would be transmitted to the lighting control system. Thus, when the video progresses to the corresponding frame, the brightness of the indoor lighting equipment will be adjusted based on the brightness value difference, preventing potential damage caused to the human eye due to the screen being too bright for a long time and the indoor environment being too dark. In addition, the effects of dark frames can also be well ensured. Otherwise if the brightness value difference doesn't exceed the preset brightness change threshold difference, then the brightness of the lighting equipment would not need to be adjusted.

According to the method for implementing a television theater mode that is provided in this embodiment, the video in play is decoded to obtain the RGB component data of the video picture being played. Then the RGB component data is analyzed to obtain a brightness value of each pixel of the video picture. An average brightness value of each frame is then calculated based on the respective brightness values of the various pixels, and an indoor lighting intensity sent by a light sensor is received in real time. Then the indoor lighting intensity is converted into an indoor brightness value, and a brightness value difference between the average brightness value and the indoor brightness value is calculated. Then a determination is further made as to whether the brightness value difference exceeds a preset brightness change threshold difference. If it exceeds, then the sound-and-light control command together with the brightness value difference is sent to the lighting control system so that when the video progresses to the corresponding frame, the brightness of the indoor lighting equipment will be adjusted based on the brightness value difference. Thus, the potential damage caused to the human eye due to the screen being too bright for a long time and the indoor environment being too dark can be prevented, and the effects of dark frames can also be well guaranteed.

Figure 3:
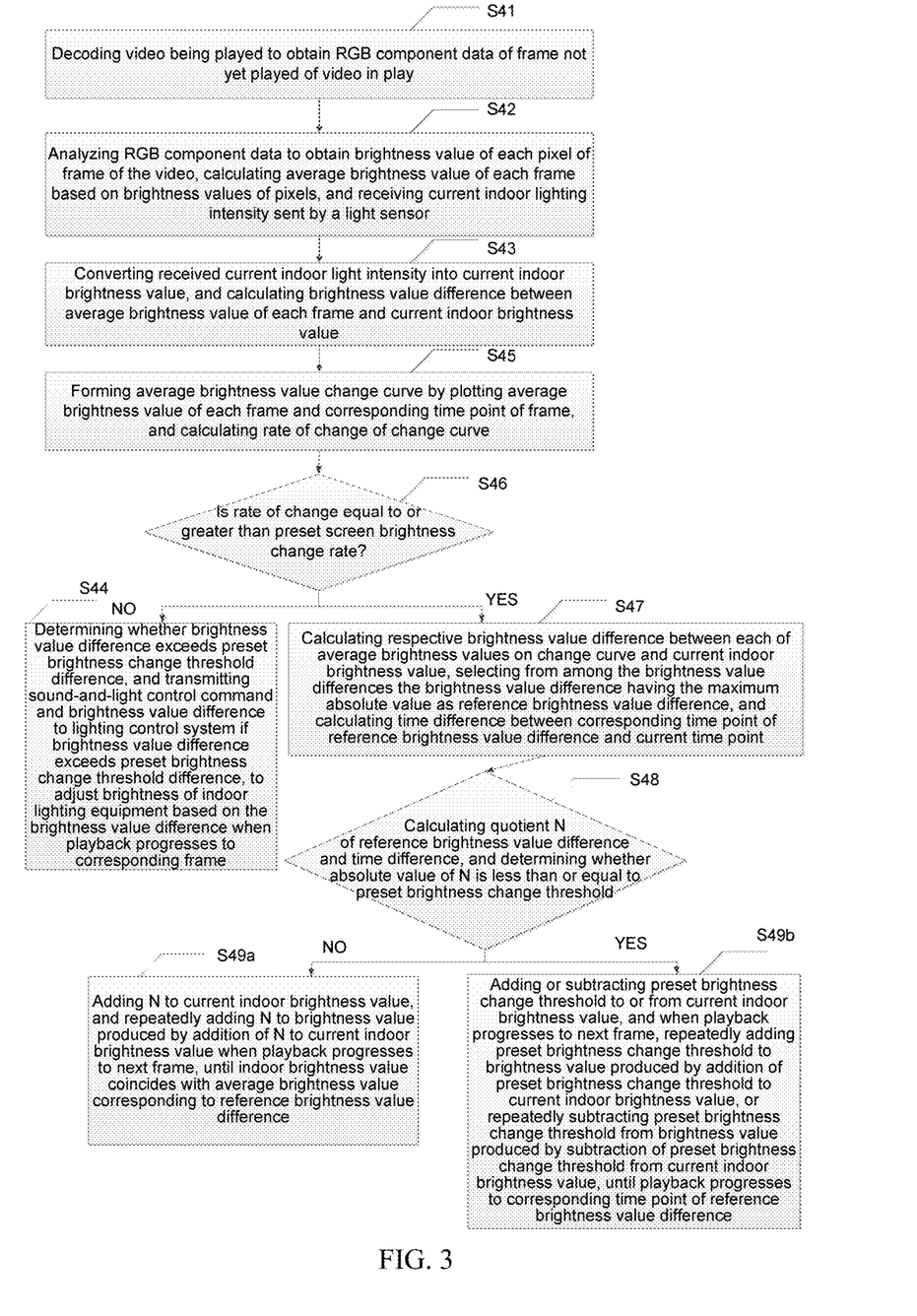
FIG. 3 is another detailed flowchart illustrating the block of "reading the video resource in play, determining a video image brightness change based on the read video resource, and sending the sound-and-light control command to a lighting control system to adjust brightness of the indoor lighting equipment based on the video image brightness change" in a third embodiment of the method for implementing a television theater mode in accordance with the present disclosure.

Referring now to FIG. 3, a third embodiment of the method for implementing a television theater mode in accordance with this disclosure is further provided on the basis of the second embodiment of the method for implementing a television theater mode.

In this embodiment, the method further includes the following blocks subsequent to block S43.

In S45, the method includes: forming an average brightness value change curve by plotting the average brightness value of each frame and a corresponding time point of the frame, and calculating a rate of change of the change curve.

In S46, the method includes: determining whether the rate of change is equal to or greater than a preset screen brightness change rate.

In S47, the method includes: if the rate of change is equal to or greater than the preset screen brightness change rate, calculating a respective brightness value difference between each of the average brightness values on the change curve and the current indoor brightness value, selecting from among the brightness value differences the brightness value difference having the maximum absolute value as a reference brightness value difference, and calculating a time difference between a corresponding time point of the reference brightness value difference and a current time point.

In S48, the method includes: calculating a quotient N of the reference brightness value difference and the time difference, and determining whether an absolute value of N is less than or equal to a preset brightness change threshold.

In S49*b*, the method includes: if the absolute value of N is less than or equal to the preset brightness change threshold, then adding the current indoor brightness value to N; when the next frame is played, adding the sum of the current indoor brightness value and N to N, until the indoor brightness value coincides with the average brightness value corresponding to the reference brightness value difference.

In S49*a*, the method includes: adding the preset brightness change threshold to the current indoor brightness value or subtracting the preset brightness change threshold from the current indoor brightness value; when the next frame is played, further adding the preset brightness change threshold to the brightness value produced from the adding operation or further subtracting the preset brightness change threshold from the brightness value produced from the subtracting operation, until the video progresses to the time point corresponding to the reference brightness value difference.

In this embodiment, the average brightness value of each frame and the corresponding time point of the frame can be taken as a coordinate reference point, thus forming an average brightness value change curve as such. For example, the average brightness value of each frame can be taken as an ordinate on a Y-axis, while the corresponding time point of this frame can be taken an abscissa on an X-axis, so as to form the average brightness value change curve. Then a rate of change of the change curve can be calculated. A further determination is made as to whether the rate of change is equal to or greater than a preset screen brightness change rate, which may be specifically set according to a comfort range of the human eye. When the rate of change is equal to or greater than the preset screen brightness change rate, then it indicates that the change of the screen brightness is too big. For example, the screen may suddenly become very bright or suddenly become very dark. In this case, the indoor lighting intensity needs to be changed in gradual steps in advance, in order to prevent an exceedingly big sudden change of the screen brightness from causing discomfort to the human eye. In this case, therefore, a brightness value difference between each average brightness value on the change curve and the current indoor brightness value is calculated, and from among the calculated brightness value differences the brightness value difference with the maximum absolute value is then selected as a reference brightness value difference, and further a time difference between the corresponding time point of the reference brightness value difference and the current time point is calculated. Then a quotient N of the reference brightness value difference and the time difference is obtained, and it is further determined whether an absolute value of N is less than or equal to a preset brightness change threshold. If the absolute value of N is less than or equal to the preset brightness change threshold, then N is taken as an addend to be added to the current indoor brightness value. Then when the next frame is played, N is once again added to the sum of the current indoor brightness value and N, until the indoor brightness value coincides with the average brightness value corresponding to the reference brightness value difference. Otherwise, the preset brightness change threshold is added to or subtracted from the current indoor brightness value, and when the next frame is played, the preset brightness change threshold is further added to the brightness value that is produced by the addition of the current indoor brightness value and the preset brightness change threshold, or further subtracted from the brightness value that is produced by the subtraction of the preset brightness change threshold from the current indoor brightness value, until the video progresses to the corresponding time point of the reference brightness value difference. For example, when the change curve is an average brightness value curve of each frame in the period 8th to 9th second of the video, and the rate of change of the curve is equal to or greater than the preset screen brightness change rate, then assuming the average brightness value at the time point 8th second is the maximum or the minimum, the brightness value difference between the average brightness value at the 8th second and the current indoor brightness value would be taken as the reference brightness value difference. Assuming the current playback time point is 2nd second, then a quotient N can be calculated by dividing the brightness value difference between the average brightness value at the 8th second and the current indoor brightness value by (8-2). Then, a determination is made as to whether an absolute value of the calculated quotient N is less than or equal to the preset brightness rate of change. When the absolute value of N is less than or equal to the preset brightness rate of change, then N is added to the current indoor brightness value, and when the next frame is played, N is once again added to the brightness value produced by the addition of N and the current indoor brightness value, until the indoor brightness value coincides with the average brightness value corresponding to the reference brightness value difference, or until a deviation of the indoor brightness value from the average brightness value that corresponds to the reference brightness value difference falls in a preset range. It can be understood that when the screen is suddenly darkened, the brightness value difference between the average brightness values on the change curve and the current indoor brightness value is a negative number, which indicates that in this case the brightness of the lighting equipment needs to be lowered. When the obtained quotient N is greater than the preset brightness change threshold, because the preset brightness change threshold is a positive number, the fact whether N is positive or negative needs to be based on to determine whether an addition or subtraction is to be performed between the current indoor brightness value and the preset brightness change threshold. When N is a positive number, then the current indoor brightness value and the preset brightness change threshold are added with each other. Otherwise when N is a negative number, then the preset brightness change threshold is subtracted from the current indoor brightness value. Then when the next frame is played, the preset brightness change threshold will repeatedly be added to the brightness value produced by the addition of the current indoor brightness value and the preset brightness change threshold, or will repeatedly be subtracted from the brightness value produced by the subtraction of the preset brightness change threshold from the current indoor brightness value, until the playback progresses to the corresponding time point of the reference brightness value difference. That is, to provide a gradual process of change, allowing the brightness of the indoor lighting equipment to gradually coincide with the brightness value of the video frames, thereby reducing the discomfort to the human eye.

According to the method for implementing a television theater mode that is provided in this embodiment, an average brightness value of each frame and a corresponding time point of the frame are taken to form an average brightness value change curve, and a rate of change of the change curve is further calculated. Then a determination is made as to whether the rate of change is equal to or greater than a preset screen brightness change rate. If the rate of change is equal to or greater than the preset screen brightness change rate, if the rate of change is equal to or greater than the preset screen brightness change rate, then a brightness value difference between each average brightness value on the change curve and the current indoor brightness value is calculated, and from among the calculated brightness value differences the brightness value difference with the maximum absolute value is then selected as a reference brightness value difference, and further a time difference between the corresponding time point of the reference brightness value difference and the current time point is calculated. Then a quotient N of the reference brightness value difference and the time difference is obtained, and it is further determined whether an absolute value of N is less than or equal to a preset brightness change threshold. If the absolute value of N is less than or equal to the preset brightness change threshold, then N is taken as an addend to be added to the current indoor brightness value. Then when the next frame is played, N is once again added to the sum of the current indoor brightness value and N, until the indoor brightness value coincides with the average brightness value corresponding to the reference brightness value difference. Otherwise, the preset brightness change threshold is added to or subtracted from the current indoor brightness value, and when the next frame is played, the preset brightness change threshold is further added to the brightness value that is produced by the addition of the current indoor brightness value and the preset brightness change threshold, or further subtracted from the brightness value that is produced by the subtraction of the preset brightness change threshold from the current indoor brightness value, until the video progresses to the corresponding time point of the reference brightness value difference. Therefore, the brightness of the indoor lighting equipment can be changed in gradual steps to coincide with the brightness value of the video frames, thereby reducing the discomfort to the human eye.

Figure 4:
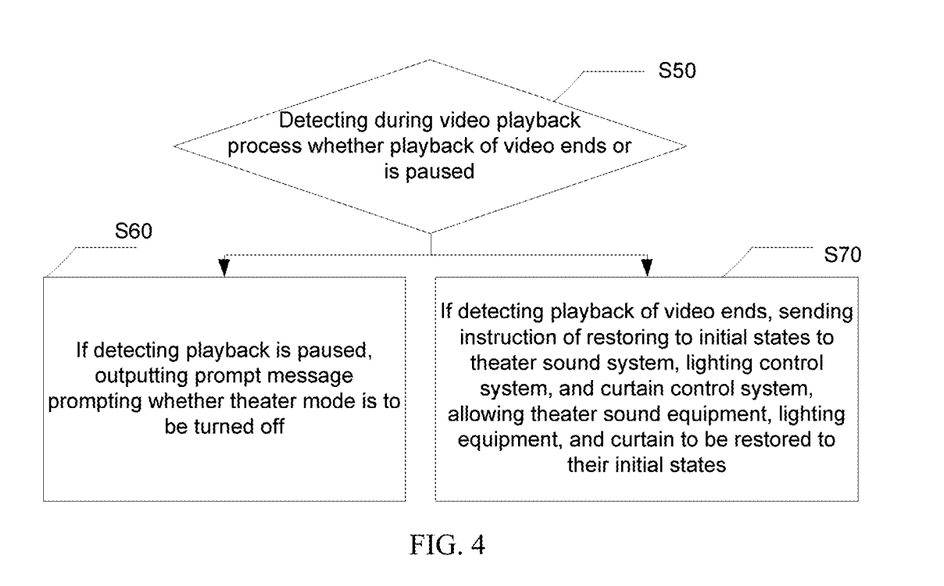
FIG. 4 is a flowchart illustrating a fourth embodiment of a method for implementing a television theater mode in accordance with the present disclosure.

Referring now to FIG. 4, a fourth embodiment of the method for implementing a television theater mode in accordance with this disclosure is further provided on the basis of the first embodiment of the method for implementing a television theater mode.

In this embodiment, the method further includes the following blocks subsequent to block S40.

In S50, the method includes: detecting during the video playback process whether the playback of the video ends or is paused.

In S60, the method includes: if detecting that the playback is paused, then outputting a prompt message prompting whether the theater mode is to turned off.

In S70, the method includes: if detecting that the playback of the video is ended, then sending an instruction of restoring to the initial state to the theater sound system, the lighting control system, and the curtain control system, allowing the theater sound equipment, the lighting equipment, and the curtain to be restored to their initial states.

In this embodiment, after the current playback environment is switched to the corresponding environment of the theater mode, a detection needs to be performed in real time during the playback process regarding whether the playback of the video ends or is paused, so as to determine whether the sound equipment, the lighting equipment, and the curtain need to be restored to their initial states. More specifically, if it is detected that the playback is paused, then at this point it would be unable to determine the user's next operation. For example, it would be unable to determine whether the user is going to leave the current environment and then come back later, or he/she needs to look for something in the current environment. If the use is to leave the current environment and then come back later, then it is generally not necessary to turn off the theater mode. Otherwise if the user is to look for something in the current environment, then the theater mode generally needs to be turned off because the lighting of the theater mode is typically dark. Therefore, it is necessary to output to the user a prompt message prompting the user whether the theater mode is to be turned off. If a user entered message is received that confirms to turn off the theater mode, then an instruction of restoring the initial states would be sent to the theater sound system, the lighting control system, and the curtain control system, so that the theater sound equipment, the lighting equipment, and the curtain would be restored to their initial states. Otherwise if a user entered message is received that indicates not to turn off the theater mode, then the current statuses would be maintained. Alternatively, the current statuses would be maintained in the event that not any user entered message is received. If it is detected that the playback of the video is ended, then an instruction of restoring to the initial states would be sent to the theater sound system, the lighting control system, and the curtain control system, allowing the theater sound equipment, the lighting equipment, and the curtain to be restored to their initial states.

According to the method for implementing a television theater mode that is provided in this embodiment, a detection is performed during the video playback process regarding whether the playback of the video ends or is paused. If it is detected that the playback is paused, then a prompt message prompting whether the theater mode is to be turned off would be output. Otherwise if it is detected that the playback of the video ends, then an instruction of restoring to the initial states would be sent to the theater sound system, the lighting control system, and the curtain control system, allowing the theater sound equipment, the lighting equipment, and the curtain to be restored to their initial states, thereby providing the user with more intelligent mode adjustment of the current environment.

Further, a fifth embodiment of the method for implementing a television theater mode in accordance with this disclosure is further provided on the basis of any one of the first through fourth embodiments of the method for implementing a television theater mode.

In this embodiment, the method further includes the following operation subsequent to block S10:

turning on the theater mode according to a received instruction, and connecting the playback terminal to the theater sound system, the lighting control system, and the curtain control system.

In this embodiment, in order to ensure that the various embodiments can be implemented properly, the playback terminal needs to turn on the theater mode in advance according to a user triggered activation instruction. In the specific implementation process, the playback terminal can automatically switch to the theater mode when detecting that the playback content is a video. Then the playback terminal would be connected to the theater sound system, the lighting control system, and the curtain control system, so as to send the sound-and-light control command to the theater sound system, the lighting control system, and the curtain control system. In the connection process, if the playback terminal still cannot communicate with the theater sound system, the lighting control system, and the curtain control system after multiple connection attempts, then the playback terminal can output a prompt to the user for the user to confirm whether the connection is incorrect.

This disclosure further provides an apparatus for implementing a television theater mode.

Figure 5:
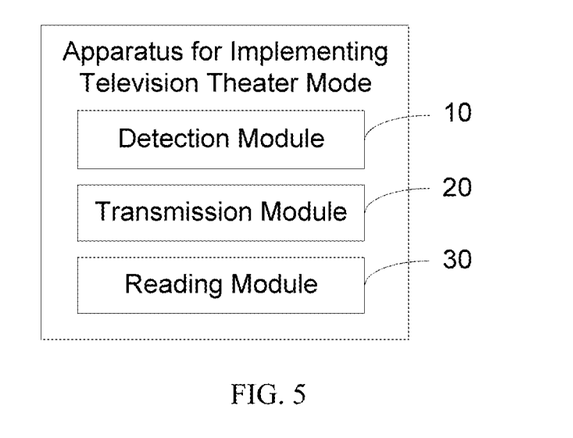
FIG. 5 is a block diagram illustrating a first embodiment of an apparatus for implementing a television theater mode in accordance with the present disclosure.

Referring now to FIG. 5, there is depicted a block diagram illustrating a first embodiment of an apparatus for implementing a television theater mode in accordance with the present disclosure.

In this embodiment, the apparatus includes a detection module 10, a transmission module 20, and a reading module 30.

The detection module 10 is configured to detect playback content of a playback terminal in real time when the playback terminal is in a playing status, and to detect current statuses of theater sound equipment, lighting equipment, and a curtain in response to detecting that the playback terminal is playing a video.

In this embodiment, when a user is watching a movie or television video, to achieve better viewing effects, the user can turn on the theater mode. Then after the user has turned on the theater mode, the playback content played by the playback terminal needs to be detected in real time when the playback terminal is in the playing status. In general, only when the user is watching a movie or a television program will the current viewing environment need to be automatically set to the theater mode. Thus, the real-time detection of the playback content played on the video player is mainly for the purpose of detecting whether the content being played is a movie or a television video. In particular, a video flag bit can be set when the playback terminal recognizes a port such as a USB port or a network port for subsequent playback of the resource information. Therefore, when the flag bit is detected, then it indicates that the content being played is a movie or television video. As one alternative, the playback content being played can be directly taken and analyzed to determine whether a movie or television video is currently being played. As another alternative, an electronic program guide of the television can also be utilized to directly learn whether the content played at the current time point is a movie or television video. It will be appreciated that the method of determining whether the currently played content is a movie or television video will not be limited to the above enumerated methods, but other possible methods are not to be detailed herein.

When it is detected that the playback terminal is playing a video, the current statuses of the theater sound equipment, the lighting equipment, and the curtain are detected. A specific type of the video may be further classified. For example, a further determination can be made as to whether the video is a variety show type video, or a movie type video, specifically according to the user's preferences. In order that the current embodiment is properly implemented, the theater sound system, the lighting control system, and the curtain control system need to be connected to the television prior to the implementation of this embodiment. Thus, respective control systems need to be installed in the theater sound equipment, the lighting equipment, and the curtain, in order to facilitate their connection with the television. The television can set up a connection with the theater sound equipment, the lighting equipment, and the curtain via various types of communication modes such as Bluetooth, WIFI, and optical fiber. The theater sound system generally includes multiple indoor audio devices, which can be controlled to adjust the sound volume and the output mode, etc. The lighting control system mainly includes a lighting control module and a communication module. The curtain control system mainly includes a curtain control module and a communication module. The lighting control system can control and adjust the indoor lighting environment through a power supply, and the curtain control system can adjust the entry status of outdoor light through related control components.

The transmission module 20 is configured to send a sound-and-light control command to a theater sound system and to a curtain control system based on the current statuses of the theater sound equipment and the curtain, to adjust a current playback environment as a sound-and-light environment of the television theater mode.

After the detection of the current statuses of the theater sound equipment, the lighting equipment, and the curtain is completed, a further determination can be made as to whether the current statuses of the theater sound equipment and the curtain are the corresponding states of the theater mode. If the current statuses of the theater sound equipment and the curtain are not the corresponding states of the theater mode, then a sound-and-light control command would be sent to the theater sound system and to the curtain control system so that various audio device would be activated according to the received sound-and-light control command, while the curtain would be pulled down or closed according to the received sound-and-light control command. Specifically, the curtain control system may include a single-chip microcomputer module, a Bluetooth, WIFI or fiber optic communication module; and a related control component. Different types of curtains generally may have different control components. For example, when the curtain is a general direct-pull up-and-down type or left-right type curtain, then the related control component may be a stepper motor, and the single-chip microcomputer may pull the curtain into motion through the stepper motor so as to directly block off the entry of outdoor light. Otherwise, if the curtain is a venetian blind, then the single-chip microcomputer may control the stepper motor in cooperation with a blind control structure to adjust an opening or closing angle of the slats, thus achieving finer control of the entry of outdoor light. In a further example, if the curtain is a new type of dimmable glass, then the single-chip microcomputer may directly output an adjustable voltage to adjust the degree of transparency of the window glass, thus achieving adjustment of the entry of outdoor light.

The reading module 30 is configured to read the video resource in play, determine a video image brightness change based on the read video resource, and send the sound-and-light control command to a lighting control system to adjust brightness of the indoor lighting equipment based on the video image brightness change.

After the speaker equipment is activated and the curtain is pulled down or closed, a screen image brightness of the video being played needs to be further taken in conjunction for the purpose of adjusting the brightness of the lighting equipment in the current playback environment. Thus, the video resource being played needs to be first read, and then the read video resource is based on to determine a video image brightness change. Then the sound-and-light control command is sent to the lighting control system to adjust brightness of the indoor lighting equipment based on the video image brightness change.

According to the apparatus for implementing a television theater mode provided by this embodiment, when a playback terminal is in a playing status, playback content played by the playback terminal is monitored in real time. When detecting that the playback terminal is playing a video, current statuses of theater sound equipment, lighting equipment, and a curtain are detected. Then based on the current statuses of the theater sound equipment and the curtain, a sound-and-light control command is sent to a theater sound system and a curtain control system to adjust a current playback environment as a sound-and-light environment of the television theater mode. Further, the video resource in play is read and then based on to determine a video image brightness change, and the sound-and-light control command is further sent to a lighting control system to adjust the brightness of the indoor lighting equipment based on the video image brightness change. Thus, discomfort caused to the eye by the screen being too bright for a long time or by sudden changes in brightness of the screen can be prevented. As a result, the screen being viewed can present even finer effects, and the current viewing environment can provide better visual and auditory effects. In addition, the viewing environment can be adjusted as the sound-and-light environment of the theater mode without needing the user for manual switching, thereby improving the intelligence of the operation process and thus enhancing the user's viewing comfort.

Figure 6:
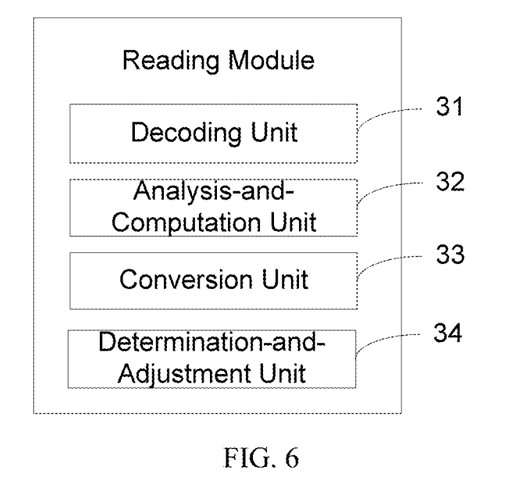
FIG. 6 is a detailed block diagram illustrating a reading module in a second embodiment of the apparatus for implementing a television theater mode in accordance with the present disclosure.

Referring now to FIG. 6, a second embodiment of the apparatus for implementing a television theater mode in accordance with this disclosure is further provided on the basis of the first embodiment of the apparatus for implementing a television theater mode.

In this embodiment, the reading module 30 includes:

a decoding unit 31 configured to decode the video in play to obtain RGB component data of a picture frame not yet played of the video being played;

an analysis-and-computation unit 32 configured to analyze the RGB component data to obtain a brightness value of each pixel of the video picture, calculating an average brightness value of each frame based on the brightness values of the pixels, and receiving a current indoor lighting intensity sent by a light sensor;

a conversion unit 33 configured to convert the indoor light intensity into a current indoor brightness value, and calculate a brightness value difference between the average brightness value and the current indoor brightness value; and a determination and adjustment unit 34 configured to determine whether the brightness value difference exceeds a preset brightness change threshold difference, and transmit the sound-and-light control command and the brightness value difference to the lighting control system if the brightness value difference exceeds the preset brightness change threshold difference, to adjust the brightness of the indoor lighting equipment based on the brightness value difference when the video progresses to the corresponding frame.

Figure 7:
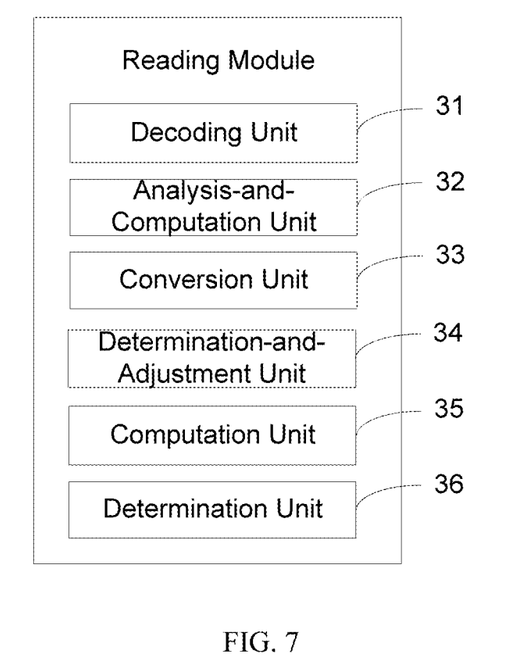
FIG. 7 is another detailed block diagram illustrating the reading module in a third embodiment of the apparatus for implementing a television theater mode in accordance with the present disclosure.

Referring now to FIG. 7, a third embodiment of the apparatus for implementing a television theater mode in accordance with this disclosure is further provided on the basis of the second embodiment of the apparatus for implementing a television theater mode.

In this embodiment, the reading module 30 further includes:

a computation unit 35 configured to form an average brightness value change curve by plotting the average brightness value of each frame and a corresponding time point of the frame, and calculate a rate of change of the change curve;

a determination unit 36 configured to determine whether the rate of change is equal to or greater than a preset screen brightness change rate; wherein the computation unit 35 is further configured to: calculate a brightness value difference between each average brightness value on the change curve and the current indoor brightness value if the rate of change is equal to or greater than the preset screen brightness change rate, and then from among the calculated brightness value differences select the brightness value difference with the maximum absolute value as a reference brightness value difference, and further calculate a time difference between the corresponding time point of the reference brightness value difference and the current time point; obtain a quotient N of the reference brightness value difference and the time difference, and further determine whether an absolute value of N is less than or equal to a preset brightness change threshold; if the absolute value of N is less than or equal to the preset brightness change threshold, then take N as an addend to add to the current indoor brightness value, and then when the next frame is played, add N once again to the sum of the current indoor brightness value and N, until the indoor brightness value coincides with the average brightness value corresponding to the reference brightness value difference; otherwise add the preset brightness change threshold to or subtract the preset screen brightness change rate from the current indoor brightness value, and when the next frame is played, further add the preset brightness change threshold to the brightness value that is produced by the addition of the current indoor brightness value and the preset brightness change threshold, or further subtract the preset screen brightness change rate from the brightness value that is produced by the subtraction of the preset brightness change threshold from the current indoor brightness value, until the video progresses to the corresponding time point of the reference brightness value difference.

Figure 8:
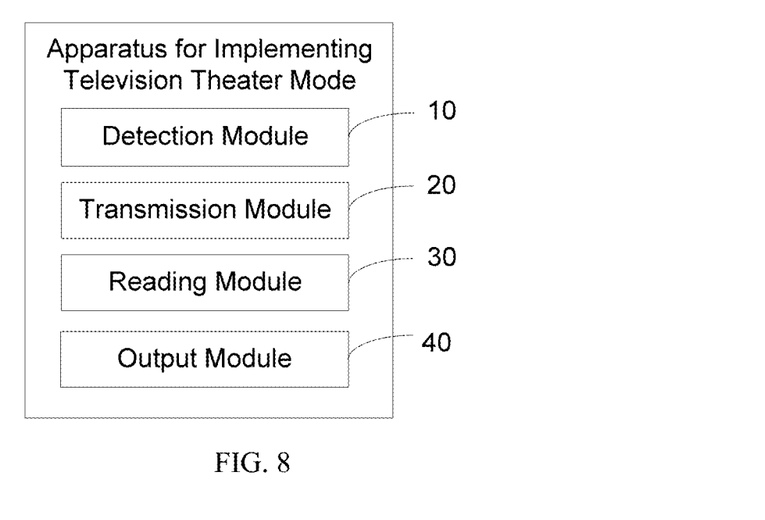
FIG. 8 is a block diagram illustrating a fourth embodiment of an apparatus for implementing a television theater mode in accordance with the present disclosure.

Referring now to FIG. 8, a fourth embodiment of the apparatus for implementing a television theater mode in accordance with this disclosure is further provided on the basis of the first embodiment of the apparatus for implementing a television theater mode.

In this embodiment, the apparatus further includes an output module 40.

The detection module is further configured to detect during the video playback process whether the playback of the video ends or is paused.

The output module 40 is configured to output a prompt message prompting whether the theater mode is to turned off if it is detected that the playback is paused.

The transmission module 20 is further configured to send an instruction of restoring to the initial states to the theater sound system, the lighting control system, and the curtain control system if it is detected that the playback of the video ends, thus allowing the theater sound equipment, the lighting equipment, and the curtain to be restored to their initial states.

Further, a fifth embodiment of the apparatus for implementing a television theater mode in accordance with this disclosure is further provided on the basis of any one of the first through fourth embodiments of the apparatus for implementing a television theater mode.

In this embodiment, the apparatus further includes:

a connection module configured to turn on the theater mode according to a received instruction, and connect the playback terminal to the theater sound system, the lighting control system, and the curtain control system.

The second to the fifth embodiments of the apparatus for implementing a television theater mode in accordance with this disclosure are substantially the same as the above-described second to fifth embodiments of the method for implementing a television theater mode, and so they are not to be detailed herein again.

The foregoing description merely portrays some exemplary embodiments according to this disclosure and is not intended to limit the patentable scope of this disclosure. Any equivalent structural or equivalent flow transformations that are made taking advantage of the present specification and the accompanying drawings and any direct or indirect applications of the present disclosure in other related technical fields shall all fall in the patentable scope of protection of this disclosure.

What is claimed is:

1. A method for implementing a television theater mode, comprising:

detecting playback content played by a playback terminal in real time when the playback terminal is in a playing status;

in response to detecting that the playback terminal is playing a video, detecting current statuses of theater sound equipment, lighting equipment, and a curtain;

sending a sound-and-light control command to a theater sound system and to a curtain control system based on the current statuses of the theater sound equipment and the curtain, to adjust a current playback environment as a sound-and-light environment of the television theater mode; and reading the video resource being played, determining a video image brightness change based on the read video resource, and sending the sound-and-light control command to a lighting control system to adjust brightness of the indoor lighting equipment based on the video image brightness change;

wherein the block of "reading the video resource being played, determining a video image brightness change based on the read video resource, and sending the sound-and-light control command to a lighting control system to adjust brightness of the indoor lighting equipment based on the video image brightness change" comprises:

decoding the video in play to obtain RGB component data of a frame not yet played of the video in play;

analyzing the RGB component data to obtain a brightness value of each pixel of the frame of the video, calculating an average brightness value of each frame based on the brightness values of the pixels, and receiving a current indoor lighting intensity sent by a light sensor;

converting the received current indoor light intensity into a current indoor brightness value, and calculating a brightness value difference between the average brightness value of each frame and the current indoor brightness value; and determining whether the brightness value difference exceeds a preset brightness change threshold difference, and if the brightness value difference exceeds the preset brightness change threshold difference, transmitting the sound-and-light control command and the brightness value difference to the lighting control system, to adjust the brightness of the indoor lighting equipment based on the brightness value difference when the playback progresses to the corresponding frame.

2. The method as recited in claim 1, further comprising the following operations subsequent to the block of "converting the received current indoor light intensity into a current indoor brightness value, and calculating a brightness value difference between the average brightness value of each frame and the current indoor brightness value":

forming an average brightness value change curve by plotting the average brightness value of each frame and a corresponding time point of the frame, and calculating a rate of change of the change curve;

determining whether the rate of change is equal to or greater than a preset screen brightness change rate;

if the rate of change is equal to or greater than the preset screen brightness change rate, calculating a respective brightness value difference between each of the average brightness values on the change curve and the current indoor brightness value, selecting the brightness value difference having the maximum absolute value as a reference brightness value difference, and calculating a time difference between a corresponding time point of the reference brightness value difference and a current time point;

calculating a quotient N of the reference brightness value difference and the time difference, and determining whether an absolute value of N is less than or equal to a preset brightness change threshold; and if the absolute value of N is less than or equal to the preset brightness change threshold, adding N to the current indoor brightness value, and repeatedly adding N to the brightness value produced by the addition of N to the current indoor brightness value when the playback progresses to a next frame, until the indoor brightness value coincides with the average brightness value corresponding to the reference brightness value difference; otherwise adding the preset brightness change threshold to the current indoor brightness value or subtracting the preset brightness change threshold from the current indoor brightness value, and when the playback progresses to a next frame, repeatedly adding the preset brightness change threshold to the brightness value produced by the addition of the preset brightness change threshold to the current indoor brightness value, or repeatedly subtracting the preset brightness change threshold from the brightness value produced by the subtraction of the preset brightness change threshold from the current indoor brightness value, until the playback progresses to the corresponding time point of the reference brightness value difference.

3. The method as recited in claim 1, further comprising the following operations subsequent to the block of "adjusting brightness of the indoor lighting equipment based on the video image brightness change":

detecting during the video playback process whether the playback of the video ends or is paused;

in response to detecting that the playback is paused, outputting a prompt message prompting whether the theater mode is to be turned off; and in response to detecting that the playback of the video ends, sending an instruction of restoring to initial states to the theater sound system, the lighting control system, and the curtain control system, allowing the theater sound equipment, the lighting equipment, and the curtain to be restored to their initial states.

4. The method as recited in claim 1, further comprising the following operations prior to the block of "detecting playback content played by a playback terminal in real time when the playback terminal is in a playing status":

turning on the theater mode in response to a received instruction, and connecting the playback terminal to the theater sound system, the lighting control system, and the curtain control system.

5. A device for implementing a television theater mode, comprising a processor and a memory storing a television theater mode implementation program, the processor being configured to execute the television theater mode implementation program to perform the following operations:

detecting playback content played by a playback terminal in real time when the playback terminal is in a playing status;

in response to detecting that the playback terminal is playing a video, detecting current statuses of theater sound equipment, lighting equipment, and a curtain;

sending a sound-and-light control command to a theater sound system and to a curtain control system based on the current statuses of the theater sound equipment and the curtain, to adjust a current playback environment as a sound-and-light environment of the television theater mode; and reading the video resource being played, determining a video image brightness change based on the read video resource, and sending the sound-and-light control command to a lighting control system to adjust brightness of the indoor lighting equipment based on the video image brightness change;

wherein the processor is further configured to execute the television theater mode implementation program to perform the following operations:

decoding the video in play to obtain RGB component data of a frame not yet played of the video being played;

analyzing the RGB component data to obtain a brightness value of each pixel of the frame of the video, calculating an average brightness value of each frame based on the brightness values of pixels, and receiving a current indoor lighting intensity sent by a light sensor;

converting the received current indoor light intensity into a current indoor brightness value, and calculating a brightness value difference between the average brightness value of each frame and the current indoor brightness value; and determining whether the brightness value difference exceeds a preset brightness change threshold difference, and if the brightness value difference exceeds the preset brightness change threshold difference, transmitting the sound-and-light control command and the brightness value difference to the lighting control system, to adjust the brightness of the indoor lighting equipment based on the brightness value difference when the playback progresses to the corresponding frame.

6. The device as recited in claim 5, wherein the processor is further configured to execute the television theater mode implementation program to perform the following operations:

forming an average brightness value change curve by plotting the average brightness value of each frame and a corresponding time point of the frame, and calculating a rate of change of the change curve;

determining whether the rate of change is equal to or greater than a preset screen brightness change rate;

if the rate of change is equal to or greater than the preset screen brightness change rate, calculating a respective brightness value difference between each of the average brightness values on the change curve and the current indoor brightness value, selecting the brightness value difference having the maximum absolute value as a reference brightness value difference, and calculating a time difference between a corresponding time point of the reference brightness value difference and a current time point;

calculating a quotient N of the reference brightness value difference and the time difference, and determining whether an absolute value of N is less than or equal to a preset brightness change threshold; and if the absolute value of N is less than or equal to the preset brightness change threshold, adding N to the current indoor brightness value, and repeatedly adding N to the brightness value produced by the addition of N to the current indoor brightness value when the playback progresses to a next frame, until the indoor brightness value coincides with the average brightness value corresponding to the reference brightness value difference; otherwise adding the preset brightness change threshold to the current indoor brightness value or subtracting the preset brightness change threshold from the current indoor brightness value, and when the playback progresses to a next frame, repeatedly adding the preset brightness change threshold to the brightness value produced by the addition of the preset brightness change threshold to the current indoor brightness value, or repeatedly subtracting the preset brightness change threshold from the brightness value produced by the subtraction of the preset brightness change threshold from the current indoor brightness value, until the playback progresses to the corresponding time point of the reference brightness value difference.

7. The device as recited in claim 5, wherein the processor is further configured to execute the television theater mode implementation program to perform the following operations:
  detecting during the video playback process whether the playback of the video ends or is paused;
  in response to detecting that the playback is paused, outputting a prompt message prompting whether the theater mode is to be turned off; and
  in response to detecting that the playback of the video ends, sending an instruction of restoring to initial states to the theater sound system, the lighting control system, and the curtain control system, allowing the theater sound equipment, the lighting equipment, and the curtain to be restored to their initial states.

8. A non-transitory computer-readable storage medium, storing one or more programs executable by one or more processors to perform the following operations:
  detecting playback content played by a playback terminal in real time when the playback terminal is in a playing status;
  in response to detecting that the playback terminal is playing a video, detecting current statuses of theater sound equipment, lighting equipment, and a curtain;
  sending a sound-and-light control command to a theater sound system and to a curtain control system based on the current statuses of the theater sound equipment and the curtain, to adjust a current playback environment as a sound-and-light environment of the television theater mode; and
  reading the video resource being played, determining a video image brightness change based on the read video resource, and sending the sound-and-light control command to a lighting control system to adjust brightness of the indoor lighting equipment based on the video image brightness change;
  wherein the block of "reading the video resource being played, determining a video image brightness change based on the read video resource, and sending the sound-and-light control command to a lighting control system to adjust brightness of the indoor lighting equipment based on the video image brightness change" comprises:
  decoding the video in play to obtain RGB component data of a frame not yet played of the video in play;
  analyzing the RGB component data to obtain a brightness value of each pixel of the frame of the video, calculating an average brightness value of each frame based on the brightness values of the pixels, and receiving a current indoor lighting intensity sent by a light sensor;
  converting the received current indoor light intensity into a current indoor brightness value, and calculating a brightness value difference between the average brightness value of each frame and the current indoor brightness value; and
  determining whether the brightness value difference exceeds a preset brightness change threshold difference, and if the brightness value difference exceeds the preset brightness change threshold difference, transmitting the sound-and-light control command and the brightness value difference to the lighting control system, to adjust the brightness of the indoor lighting equipment based on the brightness value difference when the playback progresses to the corresponding frame.

* * * * *